United States Patent [19]

Engler et al.

[11] Patent Number: 5,577,392
[45] Date of Patent: Nov. 26, 1996

[54] CRYOGENIC CHILLER WITH VORTICAL FLOW

[75] Inventors: Sidney V. Engler, Holland Landing; Clay Palbiski, Corbeil, both of Canada; Gary D. Lang, Naperville, Ill.

[73] Assignee: Liquid Carbonic Corporation, Oak Brook, Ill.

[21] Appl. No.: 435,333

[22] Filed: May 5, 1995

Related U.S. Application Data

[63] Continuation-in-part of Ser. No. 373,352, Jan. 17, 1995, abandoned.

[51] Int. Cl.⁶ ................................. F25D 25/04
[52] U.S. Cl. ............................. 62/380; 62/373
[58] Field of Search ........................ 62/373, 380

[56] References Cited

U.S. PATENT DOCUMENTS

| | | |
|---|---|---|
| 2,527,542 | 10/1950 | Gilson . |
| 3,122,897 | 3/1964 | Overbye .......................... 62/275 |
| 3,226,947 | 1/1966 | Wakatsuki et al. . |
| 3,255,608 | 6/1966 | Macintosh ....................... 62/374 |
| 3,267,585 | 8/1966 | Futer . |
| 3,287,932 | 11/1966 | Schlemmer, Jr. . |
| 3,292,384 | 12/1966 | Rubin ............................ 62/63 |
| 3,376,710 | 4/1968 | Hirtensteiner .................. 63/374 |
| 3,393,532 | 7/1968 | Khoylian ........................ 62/380 |
| 3,402,568 | 9/1968 | Kamin et al. ................... 62/380 |
| 3,403,527 | 10/1968 | Berreth et al. . |
| 3,404,989 | 10/1968 | Hirtensteiner .................. 99/193 |
| 3,427,820 | 2/1969 | Hart . |
| 3,455,120 | 7/1969 | Schlemmer . |
| 3,458,324 | 7/1969 | Kramer . |
| 3,485,055 | 12/1969 | Webster et al. ................. 62/63 |
| 3,507,128 | 4/1970 | Murphy et al. ................. 62/63 |
| 3,553,973 | 1/1971 | Moran ........................... 62/63 |
| 3,605,434 | 9/1971 | Boese ........................... 62/374 |
| 3,613,386 | 10/1971 | Klee ............................. 62/64 |
| 3,672,181 | 6/1972 | Tyree, Jr. ...................... 62/63 |
| 3,688,518 | 9/1972 | Goltsos ......................... 62/374 |
| 3,708,995 | 1/1973 | Berg ............................. 62/63 |
| 3,757,533 | 9/1973 | Kent . |
| 3,772,898 | 11/1973 | Anderson . |
| 3,805,538 | 4/1974 | Fritch, Jr. et al. . |
| 3,815,377 | 6/1974 | Tyree, Jr. ...................... 62/62 |
| 3,841,109 | 10/1974 | Cann ............................ 62/266 |
| 3,871,185 | 3/1975 | Harper et al. .................. 62/63 |
| 3,871,186 | 3/1975 | Wagner ......................... 62/64 |

(List continued on next page.)

FOREIGN PATENT DOCUMENTS

| | | |
|---|---|---|
| 1189382 | 6/1985 | Canada . |
| 0332287A1 | 9/1989 | European Pat. Off. . |
| 496675 | 7/1954 | Italy . |
| 121803 | 11/1958 | U.S.S.R. . |

OTHER PUBLICATIONS

"Cryo-Shield® Liquid Carbonic Food Freezing Systems $CO_2$," 12 Page Brochure, Liquid Carbonic, Chicago, Illinois, Form 6720, ©1981 Liquid Carbonic Corporation.
"Ultra-Freeze® can boost your profits," 4 page brochure with insert pp. 1–6, CARDOX® Division of Chemetron Corporation, Countryside, Illinois, Form No. B–1, ©1978 Chemetron Corporation.

*Primary Examiner*—Christopher Kilner
*Attorney, Agent, or Firm*—Fitch, Even, Tabin & Flannery

[57] ABSTRACT

A chiller or tunnel freezer for rapid chilling of chicken carcasses and the like wherein a cryogen such as liquid nitrogen or carbon dioxide snow is sprayed directly on the carcasses or other items as they travel through a passage or tunnel, and wherein vortical flow of air and/or vaporized cryogen is effected within the chiller to continuously sweep the bottom surface of the chiller and recirculate cryogen from the bottom surface, thereby avoiding accumulation of liquid nitrogen or $CO_2$ snow on the bottom surface. The vortical flow is preferably provided by one or more fans disposed within the tunnel. A deflector may be provided on the tunnel interior to direct recirculated cryogen onto the items being chilled. A damper may be provided to regulate fan output and thereby enable optimization of operational efficiency.

33 Claims, 3 Drawing Sheets

U.S. PATENT DOCUMENTS

| | | | |
|---|---|---|---|
| 3,871,190 | 3/1975 | Harper et al. | 62/380 |
| 3,878,691 | 4/1975 | Asztalos | 62/62 |
| 3,882,687 | 5/1975 | Asztalos et al. | 62/64 |
| 3,892,104 | 7/1975 | Klee et al. . | |
| 3,898,863 | 8/1975 | Wagner | 62/208 |
| 3,914,953 | 10/1975 | Miller . | |
| 3,916,640 | 11/1975 | Rasovich | 62/208 |
| 3,938,350 | 2/1976 | Martin et al. . | |
| 3,960,206 | 6/1976 | Baxter et al. | 165/61 |
| 4,028,774 | 6/1977 | Allan et al. . | |
| 4,077,226 | 3/1978 | Strong . | |
| 4,086,783 | 5/1978 | Wagner et al. | 62/374 |
| 4,086,784 | 5/1978 | Wagner | 62/374 |
| 4,127,008 | 11/1978 | Tyree, Jr. | 62/62 |
| 4,175,396 | 11/1979 | Miller et al. . | |
| 4,186,566 | 2/1980 | AuYoung | 62/380 |
| 4,229,947 | 10/1980 | Klee | 62/374 |
| 4,237,695 | 12/1980 | Oberpriller et al. | 62/63 |
| 4,276,753 | 7/1981 | Sandberg et al. | 62/186 |
| 4,325,221 | 4/1982 | Grewar . | |
| 4,333,318 | 6/1982 | Tyree, Jr. | 62/374 |
| 4,350,027 | 9/1982 | Tyree, Jr. | 62/374 |
| 4,399,658 | 8/1983 | Nielsen | 62/52 |
| 4,403,479 | 9/1983 | Rasovich | 62/63 |
| 4,475,351 | 10/1984 | Klee | 62/63 |
| 4,481,782 | 11/1984 | Mukerjee | 62/63 |
| 4,528,819 | 7/1985 | Klee | 62/63 |
| 4,589,264 | 5/1986 | Åström | 62/374 |
| 4,739,623 | 4/1988 | Tyree, Jr. et al. | 62/63 |
| 4,757,691 | 7/1988 | Compagnon . | |
| 4,783,972 | 11/1988 | Tyree, Jr. et al. | 62/374 |
| 4,803,851 | 1/1989 | Stokes . | |
| 4,852,358 | 8/1989 | Acharya | 62/63 |
| 4,866,946 | 9/1989 | Klee | 62/63 |
| 4,912,943 | 4/1990 | Hubert et al. | 62/374 |
| 4,914,927 | 4/1990 | Miller et al. | 62/381 |
| 4,940,599 | 7/1990 | Engler et al. . | |
| 5,018,438 | 5/1991 | Grandi | 99/335 |
| 5,054,292 | 10/1991 | Klee . | |
| 5,123,261 | 6/1992 | Cope . | |
| 5,168,711 | 12/1992 | Moore et al. . | |
| 5,365,752 | 11/1994 | Coffre . | |
| 5,444,985 | 8/1995 | Lang et al. | 62/380 X |

CRYOGENIC CHILLER WITH VORTICAL FLOW

BACKGROUND OF THE INVENTION

This is a continuation-in-part of application Ser. No. 08/373,352, filed Jan. 17, 1995, now abandoned.

The invention relates generally to chilling equipment and more particularly to a chiller employing a cryogen such as liquid nitrogen or $CO_2$ snow for cooling purposes.

One of the problems addressed by the invention is rapid chilling of poultry carcasses and the like. In chilling of poultry, it is generally desirable that the temperature of the carcass be lowered from an entrance temperature of about 100° F. to an exit temperature of about 40° F. or below, within a relatively short period of time.

In food processing, as in many other operations, it is desirable to limit the floor space occupied by any particular piece of equipment. Where tunnel freezers are employed, the length of the tunnel freezer is a consideration. It is generally desirable that the length be minimized to the extent permitted by the refrigeration requirements of a particular application. It is also generally desirable to minimize the use of cryogen in refrigerating a desired quantity of product. To this end, it is desirable that the refrigeration apparatus use cryogen efficiently.

Liquid nitrogen immersion has been used effectively in certain contexts for freezing of food products and other items, but is not ideally suited for chilling of poultry for several reasons. First, small parts such as wings may be frozen completely in the time necessary to chill the remainder of the carcass. Secondly, the cavity of the bird may accumulate liquid nitrogen, which stays in the cavity after the carcass exits the bath, resulting in freezing of the inner cavity and inefficiency in the use of the cryogenic fluid. Freezing may be undesirable where it is desired to box, package, or cut up the carcass within a short period of time after chilling. Freezing is also undesirable where the product is to be sold fresh.

Another problem with liquid nitrogen immersion for chilling of poultry is that water from the poultry tends to form ice in the liquid nitrogen bath, and the liquid nitrogen also may condense oxygen from the air.

Cryogenic sprays, e.g., sprays of liquid nitrogen or $CO_2$ snow, eliminate some of the problems of immersion, but create another problem in that excess cryogen tends to accumulate on the bottom surface of the freezer after being sprayed onto the carcasses. In the case of liquid nitrogen, one proposed solution is to allow it to accumulate in a sump, and drain the liquid into a well from where it may be pumped back into the spray system. However, this solution has several disadvantages, among them that liquid nitrogen can be difficult to pump, and that leakage of liquid nitrogen from the pump or associated piping may be problematic.

Accordingly, it is a general object of the invention to provide an improved method and apparatus for rapid chilling of poultry and other items using cryogens such as carbon dioxide snow or liquid nitrogen.

Further objects and advantages of the invention will become apparent from the disclosure set forth below, taken in conjunction with the claims and the appended drawings.

SUMMARY OF THE INVENTION

The invention generally comprises a chiller or tunnel freezer for rapid chilling of chicken carcasses and the like wherein a cryogen such as liquid nitrogen or carbon dioxide snow is sprayed directly on the carcasses or other items as they travel through a passage or tunnel, and wherein vortical flow of air and/or vaporized cryogen is effected within the chiller to continuously sweep the bottom surface of the chiller and recirculate cryogen from the bottom surface, thereby avoiding accumulation of liquid nitrogen or $CO_2$ snow on the bottom surface. In a first embodiment, the vortical flow is provided by one or more fans which direct flow downward on one side of the tunnel to blow air and/or vaporized cryogen downward and across the bottom surface of the tunnel, up the opposite side of the tunnel, and then back across the upper region of the tunnel interior. The tunnel interior is preferably configured so that recirculated cryogen is directed into contact with the carcasses or other items by the vortical flow.

In the first embodiment, a series of fans are provided in a line generally parallel to the axis of the tunnel at a location laterally offset from the axis of the tunnel, and a series of cryogen injectors such as nozzles or $CO_2$ snow horns are provided for injection of cryogen into the tunnel. The nozzles are preferably positioned to direct cryogen onto the carcasses or other items. In the case of chicken carcasses, the nozzles are preferably positioned to direct a spray directly on to the breast of the chicken.

In the first embodiment, the interior of the tunnel is generally circular-cylindrical, having a generally circular cross-section except that it is provided with a slot along the top to accommodate a shackle line, and is provided with recesses near the top on one side to accommodate the fans. The cryogen injection nozzles may all be positioned on one side of the tunnel, and the fans may be disposed on the same side of the tunnel as the cryogen injection nozzles. A deflector may be provided on the opposite side of the tunnel to direct flow of recirculated cryogen into contact with the carcasses or other items on the side opposite the cryogen injector nozzles. A damper may be provided to direct the fan output flow tangentially down along the interior wall of the tunnel, and to enable control of output flow velocity.

A second series of cryogen injectors, such as nozzles or $CO_2$ snow horns, may be provided. The second series of cryogen injectors may be positioned on the opposite side of the tunnel from the first series.

As an alternative to the tunnel having a generally circular cross-section, the tunnel may have a figure eight cross-section, comprising two generally cylindrical lobes disposed side by side, with a central fan positioned beneath the carcass to circulate cryogen downward and outward around each of the lobes, so that recirculated liquid cryogen will converge toward the top of the carcass from above on both sides.

In all of the above embodiments, means are preferably provided at one or both ends of the tunnel to exhaust $CO_2$ and/or nitrogen vapor from the tunnel to avoid buildup of high concentrations of these gases in the room in which the refrigeration apparatus is located.

DETAILED DESCRIPTION OF THE PREFERRED EMBODIMENTS

The preferred embodiments of the invention comprise refrigeration apparatus for rapid chilling of poultry carcasses or other items, and methods of operation of such apparatus. The apparatus will be described herein with specific reference to chicken carcasses suspended on a shackle line, for which the subject apparatus and method are believed to be particularly well-suited. However, it should be understood that in other embodiments, apparatus in accordance with the invention might be used for chilling of other discrete items or of other material conveyed continuously through the apparatus on a belt, for example.

Figure 1:
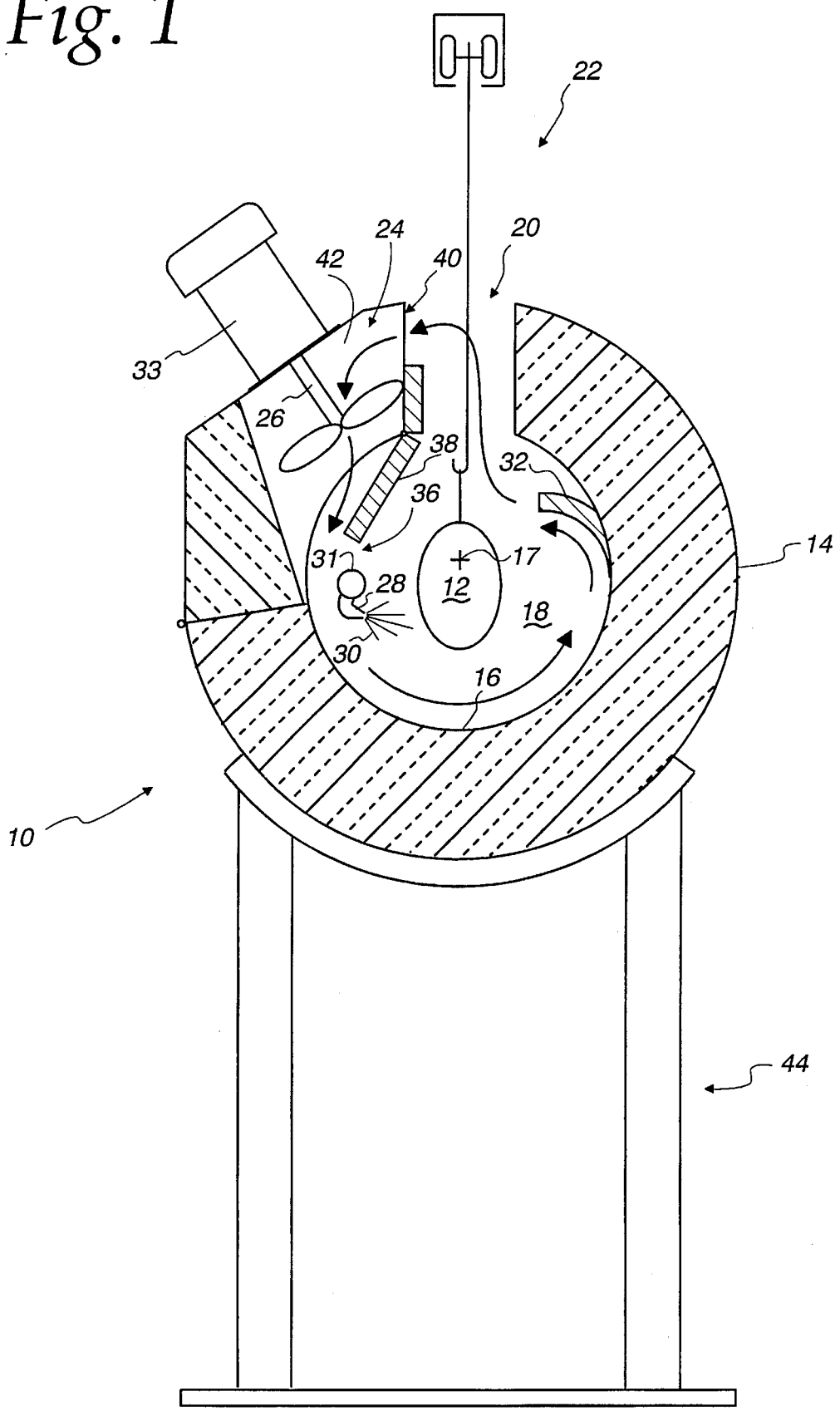
FIG. 1 is a diagrammatic transverse sectional view of apparatus in accordance with the invention.
Figure 2:
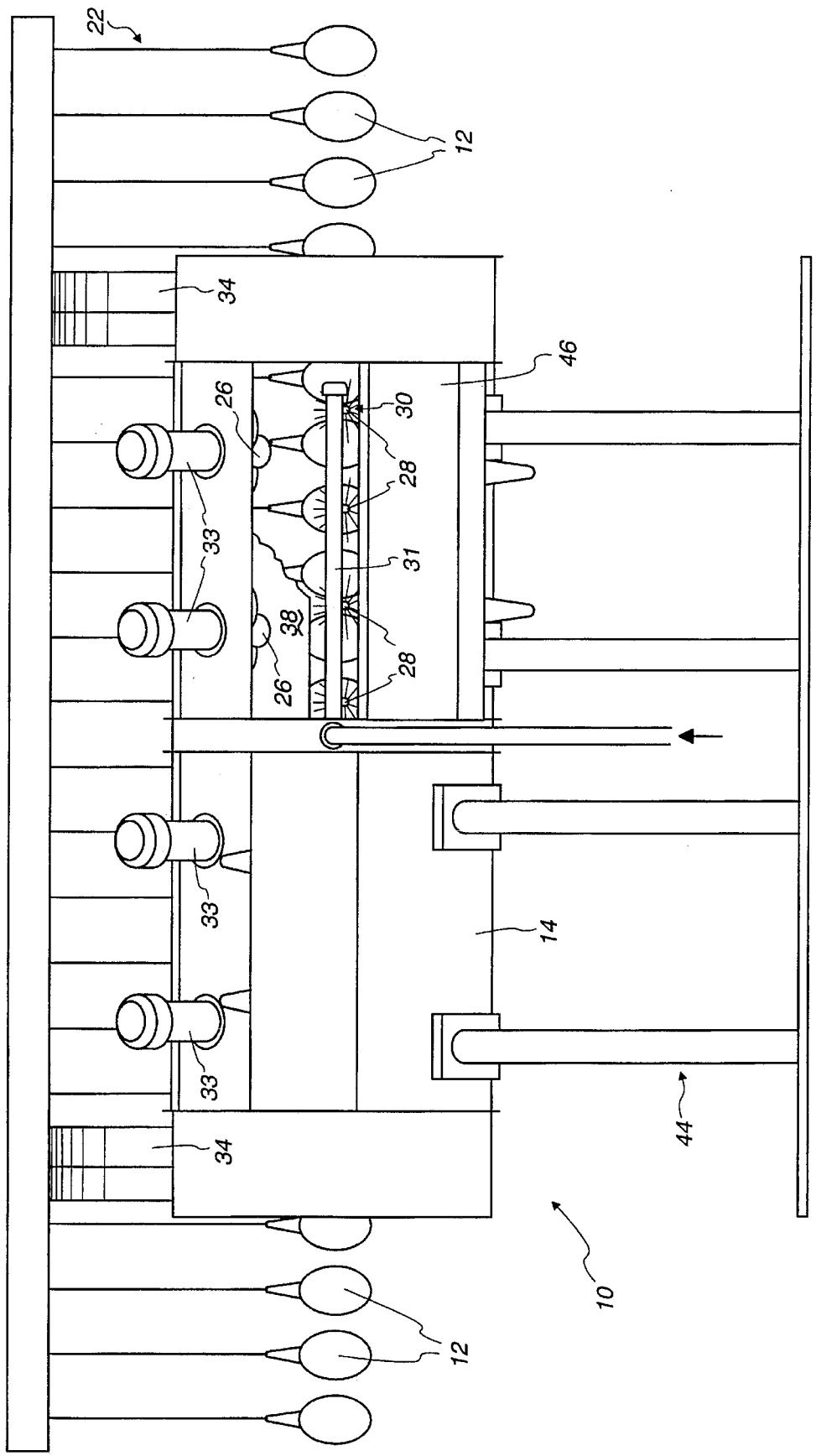
FIG. 2 is a diagrammatic side elevational view of the apparatus of FIG. 1, shown with an access door open to reveal the tunnel interior.

In a first embodiment of the invention, illustrated in FIGS. 1 and 2, the apparatus generally comprises a chiller or tunnel freezer 10 which comprises an elongated insulated tunnel 14. The tunnel 14 preferably has a nonplanar bottom surface 16. The tunnel 14 has a generally cylindrical interior 18, interrupted by a slot 20 at the top to accommodate a shackle line 22, and interrupted by recesses 24 for fans 26 at spaced locations near the top along one side.

Means for injecting a cryogen 30 into the tunnel are provided to effect cooling of chicken carcasses 12 or other material within the tunnel. The means for injecting cryogen may comprise $CO_2$ snow horns, nozzles 28 on a header 31 for injecting liquid nitrogen as shown in FIGS. 1 and 2, or other cryogen injectors.

In accordance with an aspect of the invention, the fans 26 are positioned to effect vortical flow of air and/or vapor within the tunnel interior about the longitudinal axis 17 of the tunnel to continuously sweep the bottom surface 16 of the tunnel and recirculate cryogen from the bottom surface of the tunnel. The term "vortical" as used herein is intended to denote that the flow is generally similar to a vortex in that it proceeds in a generally circular configuration. As indicated in FIG. 1, the vortical flow in that embodiment proceeds downward along one side of the tunnel, transversely across the bottom surface to sweep cryogen such as $CO_2$ or liquid nitrogen therefrom, generally upward along the opposite side, then back across the top.

In the embodiment of FIG. 1, the tunnel interior is configured so that recirculated cryogen is directed onto the chicken carcasses 12 or other items by the vortical flow. The nozzles 28 for injecting a cryogen and the fans 26 for effecting vortical air flow are positioned on the same side of the tunnel 14. The cryogen is sprayed directly onto one side of the carcasses 12, and is preferably directed at the breasts of the chickens. A deflector 32 or other structural element may be provided on the opposite side of the tunnel to direct recirculated cryogen into contact with the opposite side of the carcasses or other items. Thus, one side of the carcass 12 is sprayed directly by cryogen emanating from the nozzles 28, while the other side of the item is cooled primarily by recirculated cryogen and/or cold air, although the recirculated cryogen may swirl throughout the tunnel and make contact with virtually any portion of the surface of the item being chilled.

The vortical flow is preferably provided by one or more fans 26 oriented to direct flow downward along one side of the tunnel. In the embodiment of FIG. 1, a series of fans 26 are provided in a line generally parallel to the axis of the tunnel at a location laterally offset from the longitudinal axis 17 of the tunnel. In other embodiments, fans may be positioned or oriented differently, or means other than fans may be provided to effect vortical flow within the freezer interior. The fans may be driven by motors 33 located outside of the tunnel 14. The positioning of the fans as shown in FIG. 1 is believed to provide an advantage in that each fan's output flows generally parallel to that of adjacent fans, and contributes to the provision of a single, large axial vortical flow pattern.

One or more exhaust ducts 34 are preferably provided at one or both ends of the tunnel to exhaust $CO_2$ or nitrogen vapor from the tunnel to avoid buildup of high concentrations of these gases in the room in which the refrigeration apparatus is located.

The tunnel 14 of FIG. 1 may be configured to fit relatively closely around the carcasses or other items being cooled to promote efficiency. To this end, the tunnel interior may be sized only slightly larger than the chicken carcasses 12.

An adjustable damper 38 is preferably provided to define a fan output opening 36 of variable width, so that maximum efficiency may be attained under various operating conditions by adjustment of the damper. A fan inlet 40 is provided above the damper 38 so that recirculated air and/or cryogen vapor may reach the inlet sides of the fans 26. Divider walls 42 may be provided to facilitate efficient achievement of vortical flow. Hinged access doors 46 may be provided to facilitate cleaning and maintenance.

In some embodiments, the apparatus may achieve interior temperatures as low as $-300°$ F. where liquid nitrogen is being used, or temperatures as low as $-100°$ F. where carbon dioxide snow is employed, with heat transfer comparable to that attained in nitrogen immersion freezers, without the problems associated with liquid nitrogen immersion.

Figure 3:
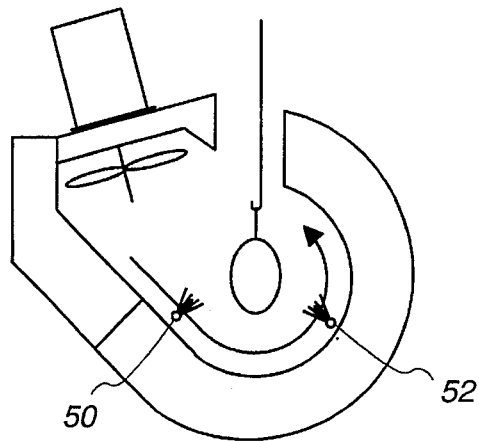
FIG. 3 is a diagrammatic transverse sectional view of apparatus in accordance with a second embodiment of the invention.

In accordance with a second embodiment of the invention, illustrated in FIG. 3, there is provided apparatus substantially similar to that described in FIGS. 1 and 2, except that more than one series of cryogen injection nozzles is provided. In the embodiment of FIG. 3, a first series of nozzles 50 is provided below the center of the carcass on the same side of the tunnel as the fan, and a second set of nozzles 52 is provided at about the same elevation on the opposite side of the carcass.

Figure 4:
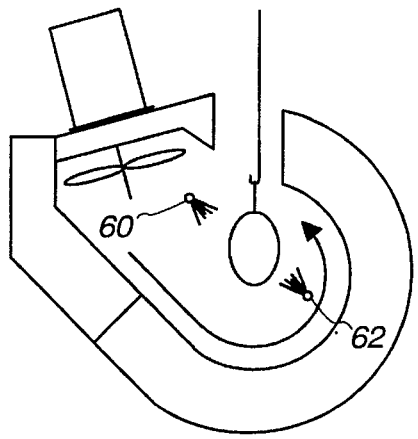
FIG. 4 is a diagrammatic transverse sectional view of apparatus in accordance with a third embodiment of the invention.

A third embodiment of the invention, illustrated in FIG. 4, is also substantially similar to that of FIGS. 1 and 2, except that a first series of nozzles 60 is provided at an elevation somewhat above the center of the carcass, to spray downward and inward toward the carcass, and a second set of nozzles 62 is provided opposite the first set, somewhat below the center of the carcass, directing a spray of cryogen upward and inward toward the carcass.

Figure 5:
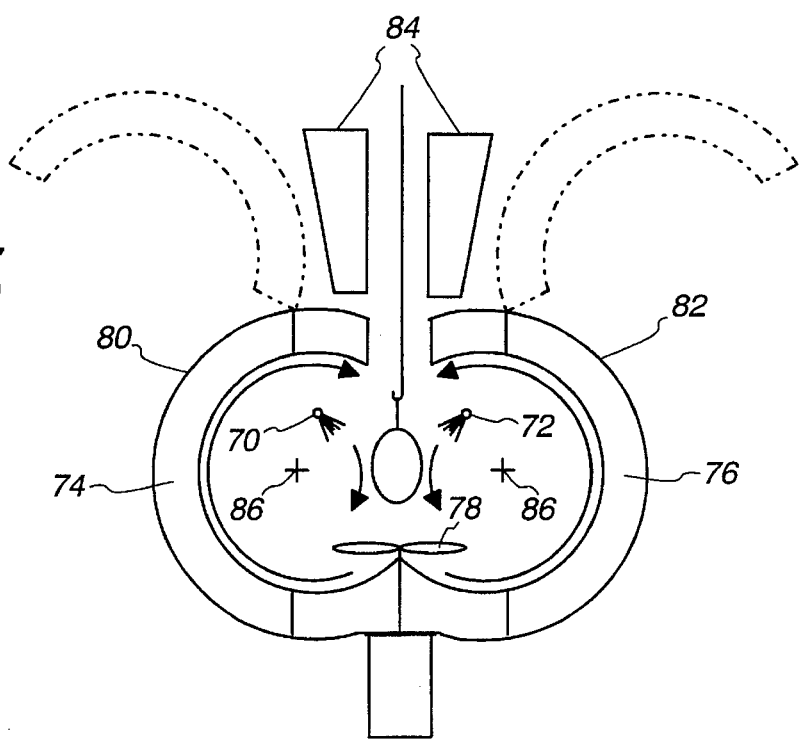
FIG. 5 is a diagrammatic transverse sectional view of apparatus in accordance with a fourth embodiment of the invention.

FIG. 5 illustrates a fourth embodiment of the invention, which is also substantially similar to the embodiment of FIG. 1, except as described below. In the embodiment of FIG. 5, two series of nozzles 70 and 72 are provided, one on each side of the carcass, each disposed somewhat above the center of the carcass, and oriented so as to direct cryogen spray slightly downward and inward toward the carcass. The tunnel has a generally figure eight shaped cross-section, comprising a pair of generally circular-cylindrical lobes 74 and 76 disposed side by side. Each lobe comprises one half of the tunnel. A single row of fans 78 is located centrally of the tunnel of FIG. 5 near the bottom thereof to direct flow of air and cryogen in the tunnel generally downward and outward along the curved bottom surface of each lobe, then upward and back toward the center of the tunnel, thus creating a double vortex, i.e., two vortices with opposite rotational directions, rotating about respective longitudinal axes 86 of the lobes, so that recirculated cryogen impinges on both sides of the carcass from above.

Access panels 80 and 82 are provided on the respective lobes and are hingedly attached near the top of each lobe so that they may be opened to the positions shown in phantom in FIG. 5 to provide access to the tunnel interior. Means for removing exhaust $CO_2$ and/or nitrogen vapor from the tunnel are provided in the form of hood elements 84 which may extend substantially along the length of the tunnel, or may alternatively be disposed only adjacent the ends of the tunnel.

In the embodiments of FIGS. 3, 4, and 5, deflectors similar to the deflector 32 shown in FIG. 1 may be provided to direct recirculated cryogen onto the carcass. Also, a damper as illustrated in FIG. 1 and described with reference thereto may be provided in the embodiments of FIGS. 3, 4, and 5, along with suitable baffles as illustrated in FIG. 1, to control air flow and promote efficiency in operation. Any of the illustrated embodiments may be modified, if desired, by addition of cryogen injectors or by changing the positions of cryogen injectors. For example, the embodiment of FIG. 5 may be modified by positioning the cryogen injector as shown in FIGS. 1, 3, or 4.

From the foregoing, it should be appreciated that the invention provides a novel and useful method of chilling carcasses or other items rapidly, with relatively low floor space requirements. The apparatus of the invention is relatively lightweight, and may be supported on a suitable base 44 as shown in FIG. 1, or suspended from above, if desired.

The invention is not limited to the preferred embodiments described above, but rather is defined by the claims set forth below.

What is claimed is:

1. Refrigeration apparatus comprising:
   an insulated tunnel having a longitudinal axis, an inlet and an outlet disposed at opposite ends of said longitudinal axis, and a nonplanar bottom surface;
   means for injecting a cryogen into the tunnel to effect cooling of material within the tunnel; and
   means for effecting vortical flow within the tunnel about the axis of the tunnel to continuously sweep the bottom surface of the tunnel and recirculate cryogen from the bottom surface of the tunnel.

2. Refrigeration apparatus in accordance with claim 1 wherein said means for effecting vortical flow comprises a series of fans disposed in a line generally parallel to the axis of the tunnel.

3. Refrigeration apparatus in accordance with claim 1 wherein said means for effecting vortical flow is disposed at a location laterally offset from the axis of the tunnel and oriented to blow downward.

4. Refrigeration apparatus in accordance with claim 1 wherein said means for injecting a cryogen into the tunnel to effect cooling of material within the tunnel comprises means for injecting liquid nitrogen into the tunnel.

5. Refrigeration apparatus in accordance with claim 1 wherein said means for injecting a cryogen into the tunnel to effect cooling of material within the tunnel comprises means for injecting carbon dioxide snow into the tunnel.

6. Refrigeration apparatus in accordance with claim 1 wherein said means for injecting a cryogen into the tunnel to effect cooling of material within the tunnel comprises a series of nozzles.

7. Refrigeration apparatus in accordance with claim 1 further comprising a longitudinal slot extending along the top of the tunnel to accommodate a shackle line for transporting material to be cooled through said apparatus.

8. Refrigeration apparatus in accordance with claim 1 wherein said means for injecting a cryogen into the tunnel are disposed generally on one side of the tunnel and oriented to direct cryogen onto one side of an item to be cooled, and wherein said apparatus further comprises a deflector located opposite the means for injecting cryogen to direct recirculated cryogen onto the item to be cooled.

9. Refrigeration apparatus in accordance with claim 1 wherein said bottom surface is curved.

10. Refrigeration apparatus in accordance with claim 1 wherein said insulated tunnel has a generally circular interior cross-section.

11. A method of cooling comprising:
    providing an insulated tunnel having a longitudinal axis, an inlet and an outlet disposed at opposite ends of said longitudinal axis, and a nonplanar bottom surface;
    injecting a cryogen into the tunnel to effect cooling of material within the tunnel; and
    effecting vortical flow within the tunnel about the axis of the tunnel to continuously sweep the bottom surface of the tunnel and recirculate cryogen from the bottom surface of the tunnel.

12. A method in accordance with claim 11 wherein effecting vortical flow comprises operating a series of fans in said tunnel in a line generally parallel to the axis of the tunnel.

13. A method in accordance with claim 11 wherein effecting vortical flow comprises operating a series of fans in said tunnel at a location offset from the axis of the tunnel and oriented to blow downward.

14. A method in accordance with claim 11 wherein injecting a cryogen into the tunnel to effect cooling of material within the tunnel comprises injecting liquid nitrogen into the tunnel.

15. A method in accordance with claim 11 wherein injecting a cryogen into the tunnel wherein injecting a cryogen into the tunnel to effect cooling of material within the tunnel comprises injecting carbon dioxide snow into the tunnel.

16. A method in accordance with claim 11 wherein injecting a cryogen into the tunnel to effect cooling of material within the tunnel comprises injecting the cryogen through a series of nozzles.

17. A method in accordance with claim 11 further comprising transporting material to be cooled through said apparatus by an overhead conveyor.

18. Refrigeration apparatus comprising:
    an insulated tunnel having a longitudinal axis, an inlet and an outlet disposed at opposite ends of said longitudinal axis, and a nonplanar bottom surface;
    a cryogen injector; and
    at least one fan for effecting vortical flow within the tunnel about the axis of the tunnel to continuously sweep the bottom surface of the tunnel and recirculate cryogen from the bottom surface of the tunnel.

19. Apparatus in accordance with claim 18 further comprising a deflector for directing cryogen swept from the bottom surface of the tunnel toward a desired location in the tunnel.

20. Apparatus in accordance with claim 19 wherein said at least one fan comprises a series of fans disposed in a line parallel to, but laterally offset from, the axis of the tunnel, and oriented to blow downward.

21. A method of chilling poultry carcasses comprising:

conveying the carcasses through an insulated tunnel having a longitudinal axis, an inlet and an outlet disposed at opposite ends of said longitudinal axis, and a nonplanar bottom surface;

spraying a cryogen onto the carcasses in the tunnel to effect cooling of said carcasses within the tunnel;

operating a plurality of fans at locations offset from the axis of the tunnel to effect vortical airflow within the tunnel about the axis of the tunnel to continuously sweep the bottom surface of the tunnel and circulate cryogen from the bottom surface of the tunnel; and deflecting recirculated cryogen inward toward the carcasses as said cryogen is circulated upward from the bottom surface of the tunnel.

22. A method of chilling poultry carcasses in accordance with claim 21 wherein spraying a cryogen onto the carcasses in the tunnel comprises spraying the cryogen directly onto the breast of the carcasses.

23. A method in accordance with claim 21 further comprising providing an adjustable damper to control fan outflow, and adjusting the damper to optimize chilling.

24. Refrigeration apparatus comprising:

an insulated tunnel having at least one longitudinal axis, an inlet and an outlet disposed at opposite ends of the tunnel, and a nonplanar bottom surface;

one or more cryogen injectors; and one or more fans disposed within the tunnel and disposed to effect vortical flow about at least one vortex axis disposed generally parallel to the longitudinal axis of the tunnel to continuously sweep the bottom surface of the tunnel and recirculate cryogen from the bottom surface of the tunnel.

25. Apparatus in accordance with claim 24 wherein the tunnel comprises a pair of longitudinally extending lobes of generally circular cross-section.

26. Apparatus in accordance with claim 25 wherein said at least one fan is disposed adjacent the bottom surface of the tunnel, and effects a pair of vortical flow patterns, one in each of said lobes.

27. Apparatus in accordance with claim 24 wherein said tunnel has a generally circular cross-section, and wherein said at least one fan creates a single vortical flow pattern only.

28. A method of chilling chicken carcasses comprising:

conveying the carcasses through an insulated tunnel having at least one longitudinal axis, an inlet and an outlet disposed at opposite ends of the tunnel, and a nonplanar bottom surface;

spraying a cryogen onto the carcasses in the tunnel to effect cooling of said carcasses in the tunnel;

operating a plurality of fans at locations within the tunnel to effect vortical flow about at least one longitudinal axis within the tunnel to continuously sweep the bottom surface of the tunnel and circulate cryogen from the bottom surface of the tunnel.

29. A method in accordance with claim 28 wherein spraying a cryogen onto the carcasses in the tunnel comprises spraying the cryogen from a first longitudinal series of nozzles and from a second longitudinal series of nozzles.

30. A method in accordance with claim 29 wherein spraying a cryogen onto the carcasses in the tunnel comprises spraying the cryogen generally upward toward the carcasses from nozzles located on opposite sides of the carcass.

31. A method in accordance with claim 28 wherein the step of spraying a cryogen onto the carcasses comprises spraying from a first longitudinal series of nozzles located above the centers of the carcasses in a generally downward direction toward the carcasses, and spraying simultaneously from a second series of nozzles located below the centers of the carcasses in an upward direction toward the carcasses.

32. A method in accordance with claim 28 wherein the step of spraying a cryogen onto the carcasses comprises spraying a cryogen generally downward from two longitudinal series of nozzles located generally above the centers of the carcasses and on opposite sides thereof.

33. A method in accordance with claim 28 wherein operating a plurality of fans at locations offset from the axis of the tunnel effects vortical air flow in two vortical patterns, each vortical pattern being centered about a longitudinal axis.

\* \* \* \* \*